R. R. HAGER.
WIND REGULATOR FOR GRAIN SEPARATORS.
APPLICATION FILED DEC. 28, 1916.

1,237,896.

Patented Aug. 21, 1917.

WITNESSES

INVENTOR
Ralph R. Hager

ATTORNEYS

R. R. HAGER.
WIND REGULATOR FOR GRAIN SEPARATORS.
APPLICATION FILED DEC. 28, 1916.
1,237,896.
Patented Aug. 21, 1917.
2 SHEETS—SHEET 2.
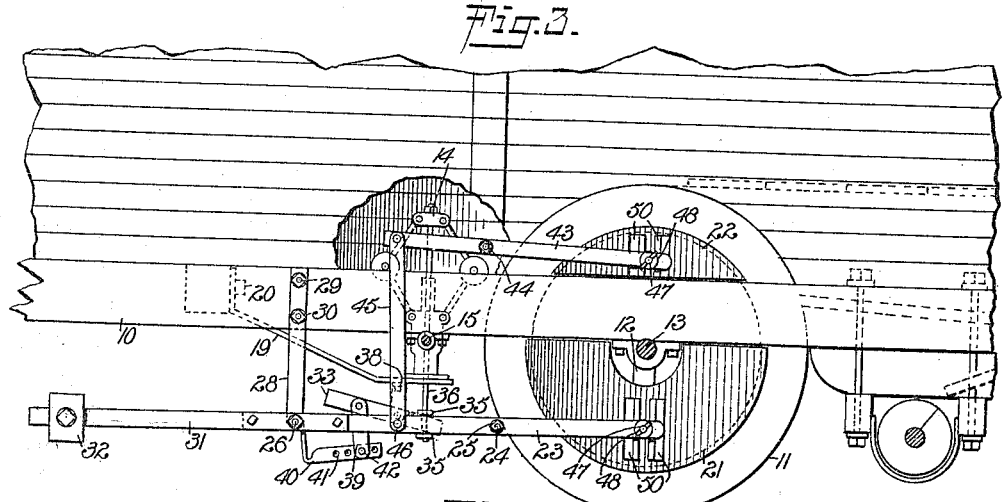
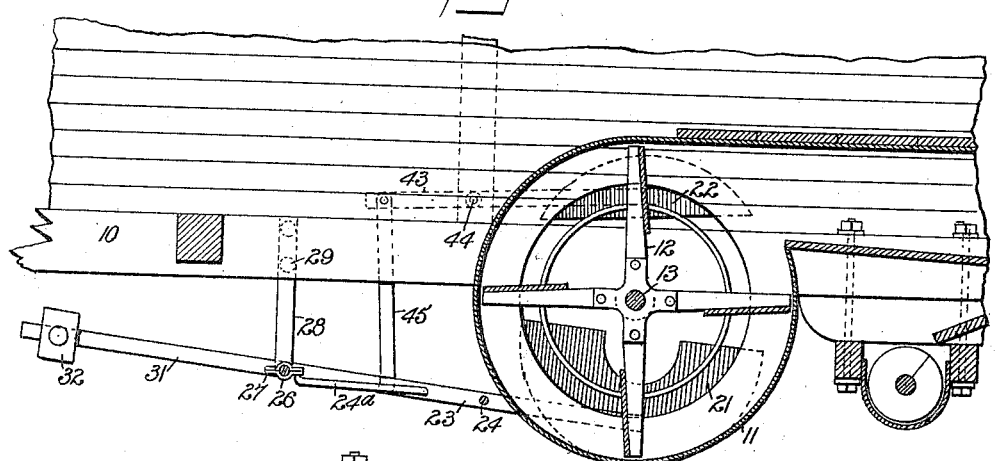
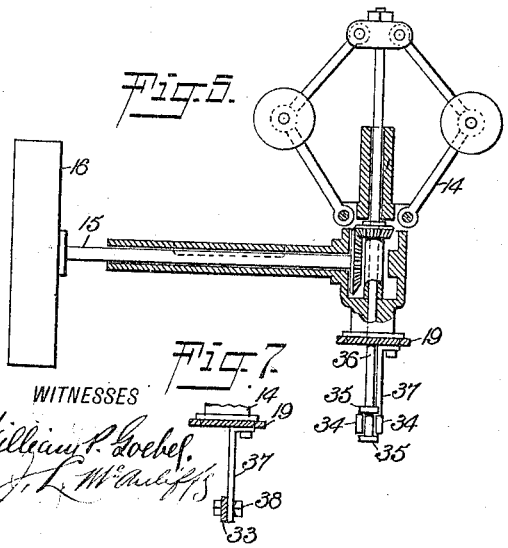
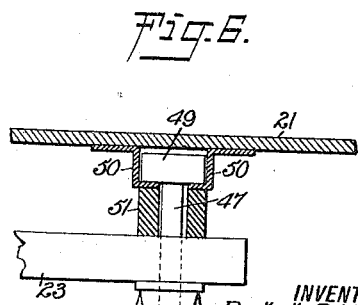
WITNESSES
INVENTOR
Ralph R. Hager
BY
ATTORNEYS

UNITED STATES PATENT OFFICE.

RALPH R. HAGER, OF FARMINGTON, WASHINGTON.

WIND-REGULATOR FOR GRAIN-SEPARATORS.

1,237,896.

Specification of Letters Patent.  Patented Aug. 21, 1917.

Application filed December 28, 1916.   Serial No. 139,247.

*To all whom it may concern:*

Be it known that I, RALPH R. HAGER, a citizen of the United States, and a resident of Farmington, in the county of Whitman and State of Washington, have invented a new and Improved Wind-Regulator for Grain-Separators, of which the following is a full, clear, and exact description.

The prime object of my invention is to provide means under the influence of a governor driven from a movable part of the separator and acting to automatically regulate blinds controlling the admission of air to the fan casing, whereby the wind will be automatically regulated with the speed of the machine so that when the machine is fed heavily and speed is reduced as invariably occurs, the blinds will open, thus giving the required amount of wind to handle the extra volume of straw and chaff on the sieves and whereby when the machine is fed lightly and the speed accordingly increases, the blinds will close and reduce the volume of wind, whereby to prevent the grain from "blowing over" as it is termed.

A more specific object of the invention is to provide for applying the invention in simple form and with facility to separators without reconstruction of the latter; and to provide for readily adjusting the parts.

The nature of the invention and the advantages of the structural form characterizing the preferred embodiment of my invention will appear as the description proceeds.

Reference is to be had to the accompanying drawings forming a part of this specification in which similar reference characters indicate corresponding parts in all the views.

Fig. 3 is a view similar to Fig. 2 with parts broken away and others in section, the blinds being shown closed;

Fig. 4 is a longitudinal vertical section on the line 4—4, Fig. 1;

Fig. 5 is a detail transverse vertical section on the line 5—5, Fig. 2;

Fig. 6 is a detail in horizontal section on the line 6—6, Fig. 2;

Fig. 7 is a transverse vertical section on the line 7—7, Fig. 1.

Figure 1:
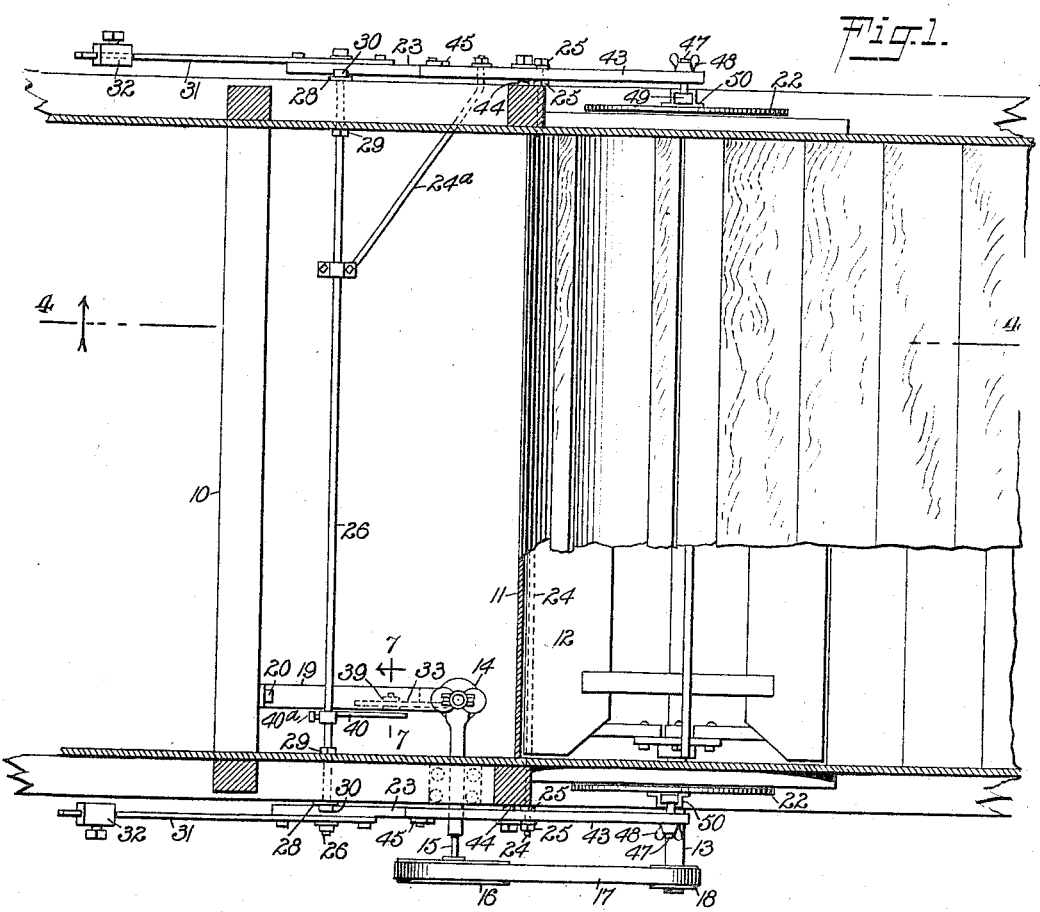
Figure 1 is a sectional plan view of parts of a separator showing my invention applied thereto.
Figure 2:
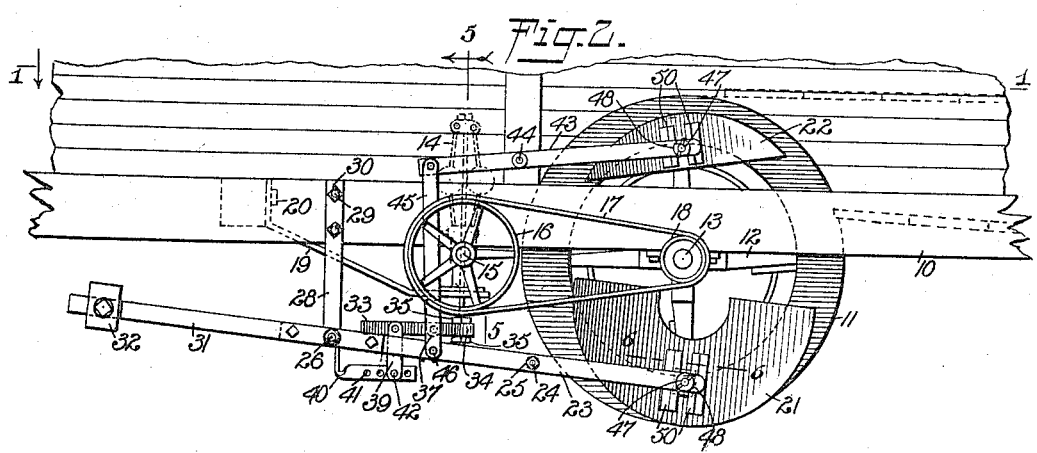
Fig. 2 is a side elevation, showing the invention applied to portions of the separator, the blinds being shown open.

In the illustrated example of my invention, the numeral 10 indicates frame parts on a grain separator which may be of any approved construction; 11, the fan casing; 12, the fan; and 13, the fan shaft, all of which parts as illustrated are of known construction.

In carrying out my invention a governor 14 of any approved form, here shown as a ball governor, is driven in any suitable manner from a rotary part of the machine. As seen best in Fig. 5, the drive shaft 15 of the governor has a pulley 16 over which a belt 17 passes, the belt being driven by a pulley 18 on the fan shaft 13. The governor may be supported on the machine in any suitable manner, as for example, on a bracket 19 secured as at 20 on any convenient frame member of the separator.

Arranged at the ends of the fan casing 11, I provide lower blinds 21 and upper blinds 22, and provide means for automatically opening and closing said blinds by moving the respective blinds at each end of the casing relatively to each other according to the speed of the governor, for which purpose the lower blinds 21 are mounted on arms 23 running longitudinally of the separator at each side. The two side arms 23 are connected by a tie rod 24 having threaded ends passing through the said arms, the threaded ends receiving clamp nuts 25 at the inner and outer faces of the arms 23, whereby to prevent the wind acting on the blinds 21 from drawing the said arms toward each other. The arms 23 are secured to a rock shaft 26 to rock therewith and there may be an additional brace 24ª from the shaft 26 to one of the arms 23, as shown best in Fig. 1.

The rock shaft 26 turns in bearings 27 (Fig. 4) on hangers 28 which are secured by bolts 29 to the frame 10 on each side, said bolts having nuts 30. The arms 23 may have counter-balance arms 31 thereon provided with adjustable weights 32.

The rock shaft 26 is operatively connected with the stem of the governor 14 for which purpose suitable operative connections may be provided between said rock shaft and stem. In the illustrated example, I provide for the purpose a lever 33 having at one end a fork 34 which is received between nuts or collars 35 on the lower end of the governor stem 36. Said lever 33 is fulcrumed on a hanger 37 suitably secured to the bracket 19 at the under side thereof as best seen in Figs. 5 and 7 having indicated in the latter figure a fulcrum bolt 38. The lever 33 at the opposite side of its fulcrum from the governor stem is connected by a hanger strap 39 with a bent rocker arm 40 rigidly secured by a set screw 40ª (Fig. 1) to the rock shaft 26. To adjust the connection between the rocker arm 40 and strap 39, said arm has a series of holes 41 to receive a pin or bolt 42 securing the same to said strap.

By the described construction, as the speed of the fan shaft 13 increases and the governor stem 36 is depressed, it will so act on the lever 33 as to lift the rocker arm 40 and thereby rock the shaft 26 and arms 23, thus giving a closing movement to the lower blinds 21.

In order to simultaneously close the upper blinds 22 with the closing of the lower blinds 21, I operate said upper blinds by the movements of the bars 23 for which purpose, said upper blinds are carried on lever arms 43 fulcrumed as at 44 to any convenient part of the separator, said lever arms being connected with the arms 23 by strap links 45 secured as at 46 to said arms 23. Thus, as the arms 23 are rocked upwardly to give a closing movement to the lower blinds 21, the lever arms 43 will be rocked to give a closing movement to the upper blinds 22. Thus, the wind will be reduced proportionately to the increase of speed of the fan. Upon the machine slowing down as by heavy feeding of material, the governor stem will be raised and will lift the lever 33, thereby opening the blinds which will result in an increase of wind to take care of the increased volume of straw and chaff.

To provide for adjusting the blinds on their respective arms, in order to insure the proper movements of the blinds relatively to the axis of the fan shaft, I provide means best shown in Fig. 6 which it will be seen comprises a pin 47 threaded at its outer end to receive a wing nut 48 or the like and formed with a head 49 at the inner end, said head being received in a vertical slot, produced on each blind by means of separated angular elements 50 arranged in pairs on the blinds and rigid therewith. Sleeves 51 are disposed between each arm (23, 43) and the faces of the elements 50. Thus the blinds may be adjusted vertically on their arms and securely held in adjusted position.

The arrangement provides for adjusting the blind members while maintaining their proper angular relation and without disturbing the permanent adjustment of the blind carrying arms or their actuating means, since the coacting blind members in being adjusted to and from each other may at the same time be turned about the axes of the pins 47.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention I claim as new, and desire to secure by Letters Patent:

A wind regulator for separators including blind members arranged in pairs, pivoted arms each carrying at one end thereof a blind member of each pair, means to rockably mount the said arms between the ends thereof on a separator for positioning said blind members at the ends of a fan case, and swing the said members bodily through an angle to close or open the said case, arms each carrying another blind member of each pair and operatively connected with the first arms to move the latter, flanged elements on each blind member and spaced to form an undercut guide slot, a bolt extending through each arm having a head disposed in said slot to be moved therein to vary the point of connection of the blind member and arm, and a nut on each bolt.

RALPH R. HAGER.